United States Patent [19]

Seal, Jr.

[11] Patent Number: 5,035,174
[45] Date of Patent: Jul. 30, 1991

[54] JUICE EXTRACTOR

[75] Inventor: John S. Seal, Jr., Ardmore, Pa.

[73] Assignee: The John S. Seal, Jr., Revocable Trust, Philadelphia, Pa.

[21] Appl. No.: 485,787

[22] Filed: Feb. 23, 1990

Related U.S. Application Data

[63] Continuation of Ser. No. 247,677, Sep. 22, 1988, abandoned.

[51] Int. Cl.⁵ .................. B30B 15/14; B30B 9/02; B30B 1/18
[52] U.S. Cl. .................. 100/52; 99/495; 99/506; 99/507; 100/53; 100/98 R; 100/125; 100/131; 100/213; 100/215; 100/218; 100/245; 100/255; 100/256; 100/289
[58] Field of Search .................. 100/49, 50, 52, 53, 100/107, 108, 131, 213, 215, 218, 245, 255, 256, 230, 289, 110, 116, 125, 48, 98 R; 99/495, 506, 507, 509, 510

[56] References Cited

U.S. PATENT DOCUMENTS

| | | | |
|---|---|---|---|
| 492,259 | 2/1893 | Barrett | 100/125 X |
| 626,727 | 6/1899 | Shepherd | 100/125 X |
| 1,576,234 | 3/1926 | Cozzoli | 100/52 |
| 1,918,658 | 7/1933 | Mitcham | 100/289 X |
| 2,164,245 | 6/1939 | Kienzle | 100/289 X |
| 2,522,800 | 9/1950 | Quiroz | 100/213 X |
| 2,581,294 | 1/1952 | Read et al. | 100/125 X |
| 2,677,324 | 5/1954 | Cadella | 100/213 X |
| 3,108,533 | 10/1963 | Read et al. | 100/125 X |
| 3,204,550 | 9/1965 | Swiderski et al. | 100/289 X |
| 3,613,560 | 10/1971 | Bottas et al. | 100/52 |
| 3,918,360 | 11/1975 | Stratman et al. | 100/52 |
| 4,235,164 | 11/1980 | Allen et al. | 100/245 X |
| 4,570,536 | 2/1986 | Dodd | 100/53 |

FOREIGN PATENT DOCUMENTS 2431123  1/1975  Fed. Rep. of Germany ........ 100/52

Primary Examiner—Harvey C. Hornsby
Assistant Examiner—Stephen F. Gerrity
Attorney, Agent, or Firm—Woodcock Washburn Kurtz Mackiewicz & Norris

[57] ABSTRACT

Improved apparatus for extracting juice is disclosed. The apparatus disclosed provide a novel safety switch arranged such that the apparatus may be operated only when fully closed, thereby precluding injury to the operator or damage due to objects being placed in the path of the downwardly descending squeezer. In a preferred embodiment the juice extraction cycle is carried out automatically by means of limit switches, once the safety switch enables the motor. Embodiments are disclosed wherein the limit switches which govern the extraction cycle operate by determining the amount of pressure placed on an object, the level of pressure being adjustable, thus allowing the complete and efficient squeezing of objects of different sizes and firmness. Also disclosed are embodiments incorporating a feeder tube and actuation device whereby the juice extraction apparatus is automatically fed.

5 Claims, 4 Drawing Sheets

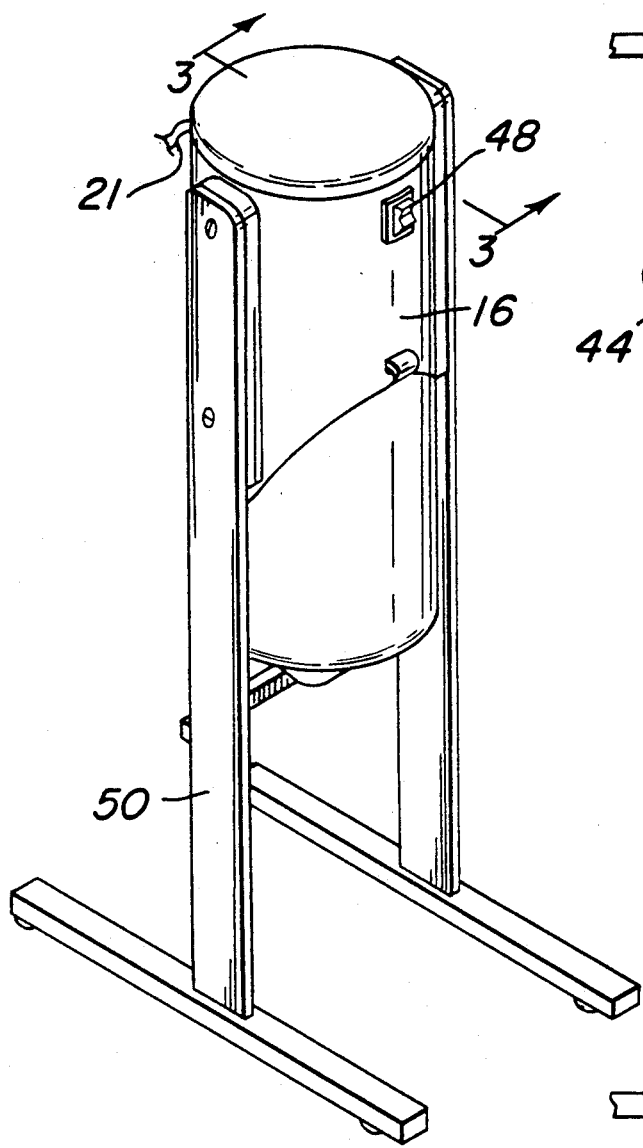
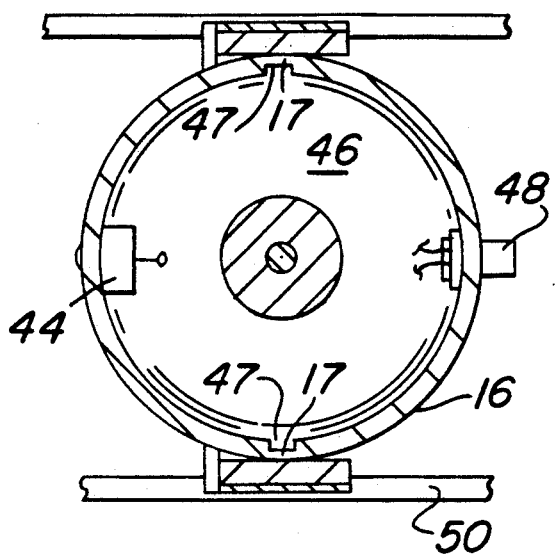
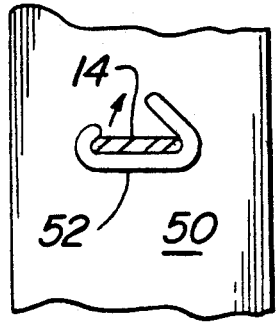
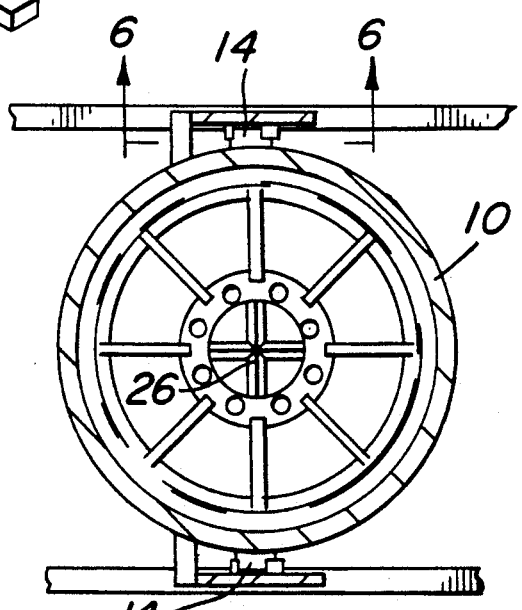

JUICE EXTRACTOR

This is a continuation of application Ser. No. 247,677, filed Sept. 22, 1988, now abandoned.

FIELD OF THE INVENTION

The present invention relates to apparatus and methods for extracting juice from oranges and other fruit. More specifically, the present invention relates to improvements in the safety and efficiency of such apparatus.

BACKGROUND OF THE INVENTION

Although it is desirable to squeeze fruit juices, such as orange juice, immediately prior to their being consumed, most consumers utilize canned or frozen juices because of the inadequacy of currently available methods and apparatus for extracting juice.

In order to extract juice, the fruit must be crushed, squeezed or compressed in some manner. Several prior devices have attempted to relieve the consumer of the labor involved in this operation by designing any number of mechanical or electromechanical devices to aid in the extraction of juice. In addition to the consumer market, the labor savings aspect of these devices are also directed toward the food service industry, particularly restaurants and hotels wishing to serve freshly squeezed juice upon its being ordered.

For example, U.S. Pat. No. 1,918,658—Mitcham discloses both manually operated and power driven juice extractors. The power driven juice extractor shown in FIG. 6 of Mitcham reveals that a worm gear 88 is used to drive a worm wheel 85, which is affixed to a power screw 84. The fruit is thus compressed by the lowering of the plunger 71 into the tapered cup 62. Mitcham also discloses a control system for the power driven juice extractor shown in FIG. 6, which causes the plunger 71 to be driven down until a reversing switch 92 is tripped. The rotation of the motor 90 is reversed, causing the plunger 71 to be retracted. A lever 117 and two contacts 96,97 are used to stop the rotation of the motor when the plunger is fully withdrawn.

It would be desirable to provide apparatus whereby juice may be extracted without any danger of the user being injured by the apparatus. It is therefore an object of the present invention to provide juice extracting apparatus which was capable of operation only when fully closed.

It is further desirable to provide juice extracting apparatus which is convenient to operate. Accordingly, it is another object of the present invention to provide a juice extractor into which oranges or other fruit is easily placed. It is also an object of the present invention to provide a juice extractor which automatically completes an extraction cycle without input from the operator.

SUMMARY OF THE INVENTION

The present invention satisfies these and other objectives by providing juice extraction apparatus having a pivotable cup. Contained within the pivotable cup is a piercer and extractor; the bottom portion of the cup forms a discharge nozzle through which the extracted juice may flow. The upper portion of the cup has a portion of a latch mechanism attached to it.

The pivotable cup is disposed beneath an upper housing which contains a motor driven squeezer. The other portion of the latch mechanism is located on the upper housing. The latch portion interacts with an electrical switch thereby allowing the motor driven squeezer to be actuated only when the pivotable cup is in the fully closed position. This arrangement thus provides a novel combination of safety and convenience since when fully closed, the juice squeezing mechanism is inaccessible to the operator and is also self-contained, thus reducing leakage.

In operation, the present invention further provides limit switches mounted within the upper housing. Upon receiving an actuation signal, the motor drives the squeezer vertically downward, urging the fruit against the piercer until a first limit switch is tripped. The motor then reverses direction until the squeezer is returned to its fully withdrawn position, where a second limit switch is tripped, which stops the motor's rotation. In another embodiment, the first limit switch is a pressure switch which reverses the motor's rotation upon sensing the force with which the squeezer is urging against the object. In certain embodiments, the level of pressure which causes the reversal is adjustable via an external knob.

Certain embodiments of the present invention also allow several objects to be placed in a feeder tube and automatically cycled through the juice extraction apparatus.

BRIEF DESCRIPTION OF THE DRAWINGS

FIG. 1 is a perspective view of the juice extractor of the present invention.

FIG. 4 is a cross-sectional view of the juice extractor of FIG. 2, taken along lines 4—4, illustrating the positioning of components in the upper housing and certain aspects of the operation of the present invention.

FIG. 5 is a cross-sectional view of the juice extractor of FIG. 2, taken along lines 5—5 illustrating the piercing and extraction apparatus located at the bottom of the pivotable cup.

FIG. 6 is a partial cross-sectional side view showing the pivot mounting of the juice extractor of FIG. 5, taken along lines 6—6.

DETAILED DESCRIPTION OF THE PREFERRED EMBODIMENT

Figure 2:
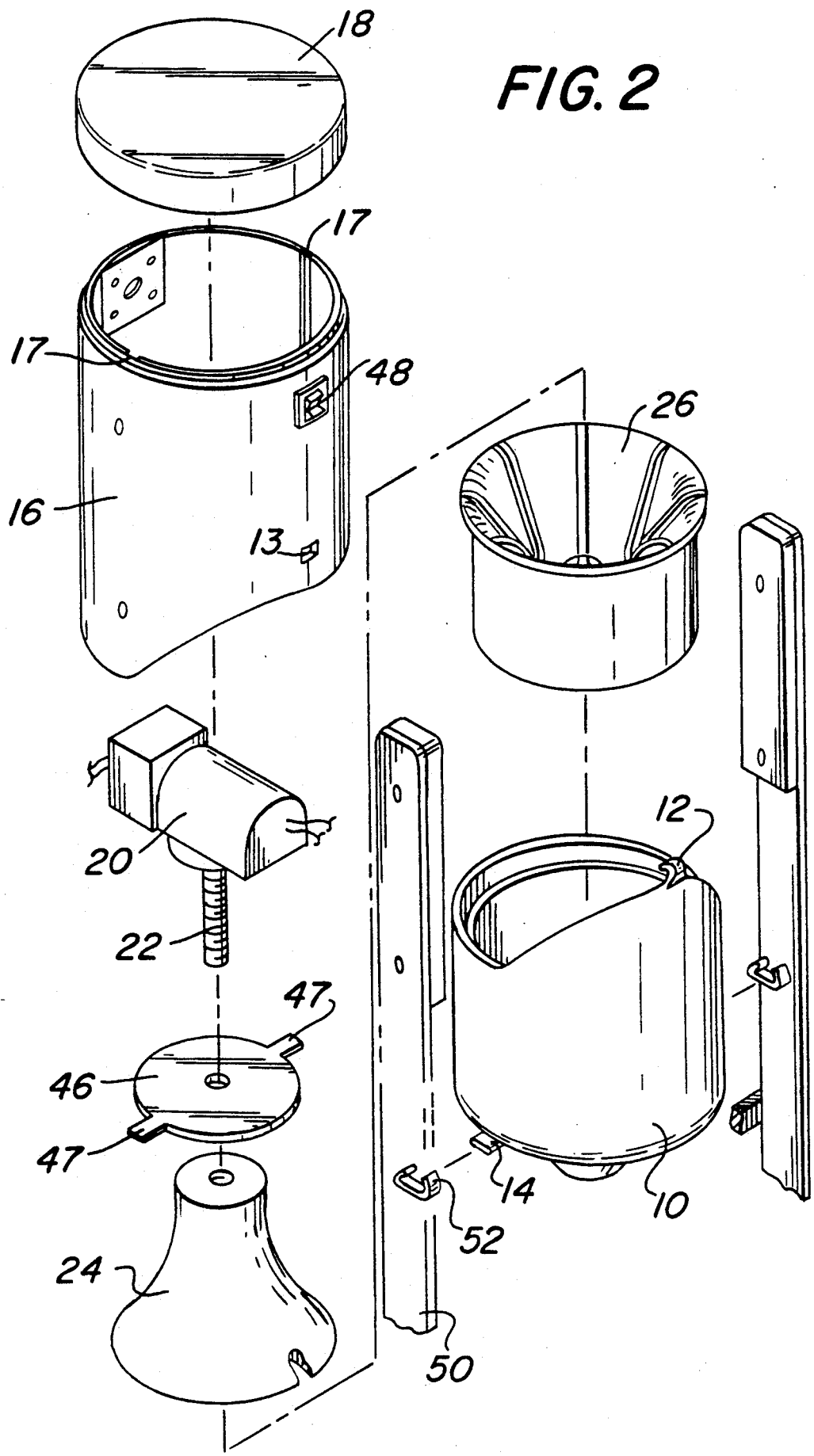
FIG. 2 is an exploded view of the main components of the juice extractor of the present invention.

Referring first to FIG. 1, there is illustrated apparatus for extracting juice according to the present invention, having a pivotable cup 10 for receiving the fruit or vegetables to be squeezed. The pivotable cup 10 is easily removable and thus may be easily cleaned. Also visible are the base or support means 50 and upper housing 16. An activation switch 48 controls the operation of the juice extractor of the present invention by the consumer. In a preferred embodiment, household current is provided via an electric power cable 21. However, the present invention also encompasses embodiments operated via storage batteries or other sources of electromotive force.

FIG. 2 illustrates the major components of the juice extractor of the present invention. As shown in the exploded view, the motor 20 is attached to a threaded rod 22, which drives a limit switch plate 46 and squeezer 24. These components normally reside within the housing 16 and are accessible through the cap 18. As further seen in FIG. 2, the lower portion of the juice extractor of the present invention is comprised of a base or support means 50, shown partially broken away. Pivotably attached to the support means 50, at pivot brackets 52, is the pivotable cup 10. It will be appreciated that the cup extensions 14 interact with pivot brackets 52 to allow the pivotable cup 10 to be tilted away from its vertical or closed position to an open position, tilted away from a vertical axis; it is also seen that pivot brackets 52 allow the cup 10 to be easily removed and cleaned by hand or in a dishwasher. Also shown are limit switch plate guides 47 and the slots 17 with which they cooperate.

Figure 3:
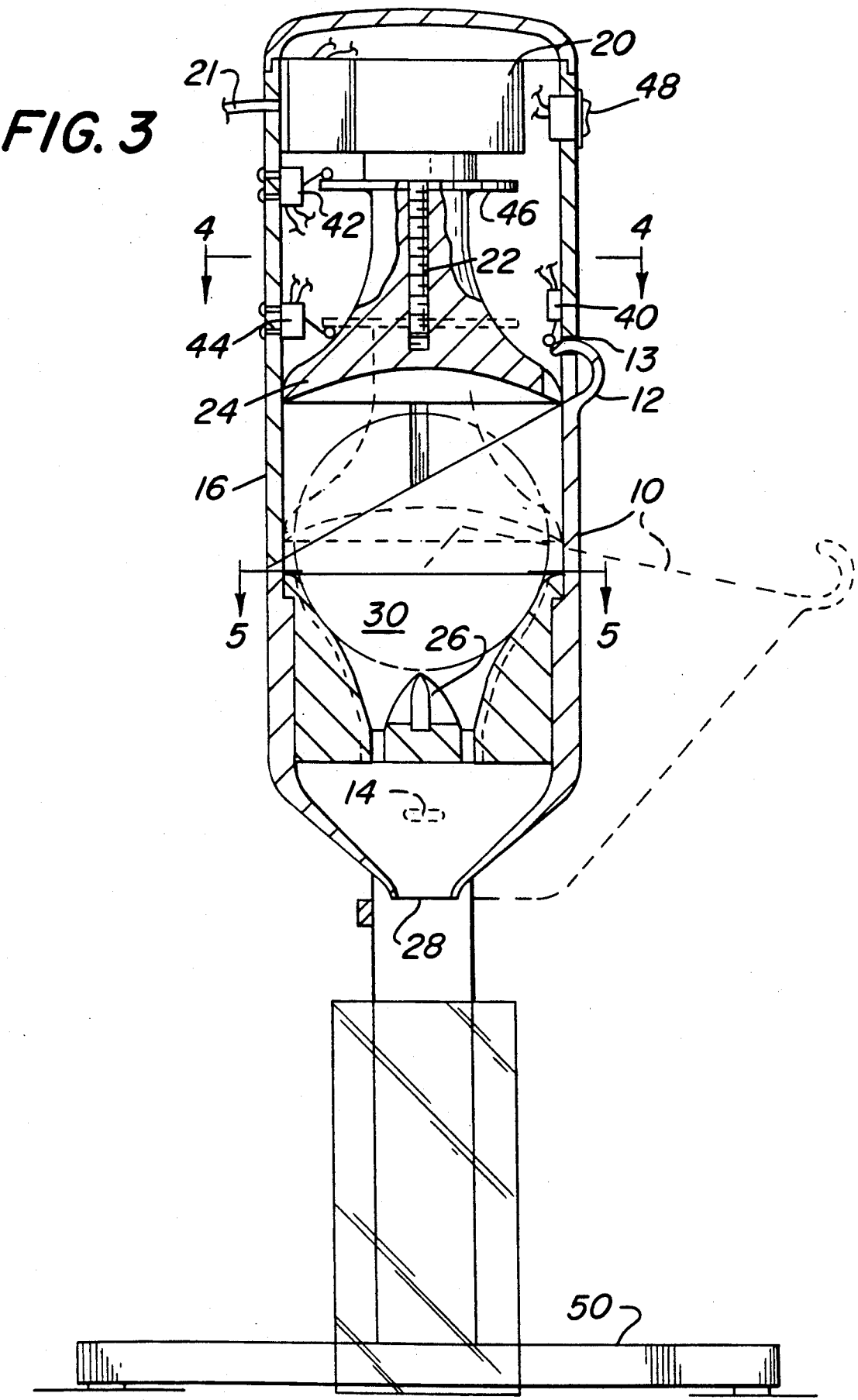
FIG. 3 is a cross-sectional view of the juice extractor of FIG. 1, taken along lines 3—3.

As best shown in FIG. 3, the pivotable cup 10 of the present invention may be moved from a closed to an open position. The pivotable cup 10 is shown in phantom in its open or receiving position and in solid lines in its closed or operating position. When the pivotable cup 10 is in the closed or operating position, a user's hand or any other object cannot be placed therein.

Referring still to FIG. 3, further details of the orange juice squeezer of the present invention are shown. Within the upper housing 16, a motor 20 is disposed which drives a threaded rod 22 which, when turned, moves the squeezer 24, downward along a vertical axis, thereby squeezing the orange 30 and forcing the juices therefrom into the discharge nozzle 28.

The novel incorporation a safety switch 40 into the actuation circuit permits the apparatus of the present invention to be operated only when the pivotable cup 10 is in its fully closed or operating position. When the pivotable cup 10 is closed, the hook-like portion of the latch mechanism 12 protrudes into the housing 16 through the opening 13, thereby forming a latch closure and also comes into contact with a safety switch 40. In a preferred embodiment the receiving portion of the latch mechanism 13 comprises an opening in the housing 16, shaped so as to interact with the hook-like latch portion 12 of the pivotable cup 10 to form a latch. One of ordinary skill in the art will realize, however, that the latch closure illustrated is merely one preferred embodiment of a means for both keeping the pivotable cup 10 in the closed position, while also activating the safety switch 40. For example, the safety switch 40 may be placed at on the cup 10 itself or the housing 16, such that it will only activate the motor circuit when the cup is closed. Alternatively, the switch may be placed so as to interact with the cup extensions 14 in a similar manner.

When the latch portion 12 of the pivotable cup 10 is in contact with the safety switch 40, the circuit governing the actuation of the motor 20 is enabled. The user then activates the activation switch 48, energizing the motor 20 and beginning a juice extraction cycle. However, if the cup is in the open position, or in any position other than fully closed, the motor 20 is cut off from the power source, provided in a preferred embodiment by a cable 21, and cannot initiate an extraction cycle. This feature provides a clearly advantageous safety feature since, it is impossible for the users hand, clothing or any utensils to come into contact with the downward descending squeezer 24, which would urge them against the sharpened blades of the piercer 26. The safety switch 40 further adds to the convenience of the juice extractor of the present invention by ensuring that the pivotable cup 10 is in an upright and closed position, thereby substantially eliminating the possibility of the juices being extracted spilling outside the pivotable cup 10.

FIG. 3 also illustrates certain aspects of the operation of the juice extractor of the present invention. As shown in solid lines, the squeezer 24 is disposed within the upper portion of the housing 16 at the beginning of an extraction cycle. When the pivotable cup 10 is fully closed, the operation of the activation switch 48 enables the motor 20 to begin rotating. As the motor 20 rotates, the squeezer 24 is driven vertically downward and urges against the object to be squeezed 30. As shown in phantom, the squeezer 24 will reach a lower limit of travel, at which point the juice will have been substantially extracted and will have flowed through the discharge nozzle 28.

The automatic cycling of the extraction process can also be seen by reference to FIG. 3. Two limit switches 42,44 are provided for fully automatic operation. As shown in solid lines, when the plate 46 attached to the squeezer 24 is in its fully retracted position the upper limit switch 42 is activated and lower limit switch 44 is not. As shown in phantom, at the lower limit of travel the plate 46 strikes the lower limit switch 44, causing the motor 20 to automatically reverse. Plate 46 and squeezer 24 then retract vertically upward until the plate again strikes upper limit switch 42. At this time, operation automatically ceases.

In another embodiment of the present invention, the lower limit switch 44 is comprised of a pressure switch, which is capable of sensing the force with which the squeezer 24 urges against the fruit to be squeezed 30. One advantage of this embodiment is that the lower limit of travel of the squeezer 24 is not a fixed linear distance from the upper limit of travel, but instead depends upon the pressure exerted by the squeezer 24. Thus, if a smaller fruit, such as a peach is squeezed, the squeezer 24 will travel downward until a certain level of pressure is sensed. If the squeezer were then operated with a larger fruit, such as a grapefruit, the pressure exerted would be the same, although the lower limit of travel would be different. This design also presents the advantage of preventing damage to the juicer blades if an object which cannot be squeezed is placed in the cup. In this situation, the squeezer 24 will urge upon the object until the pressure limit is reached, and then retract. If the pressure limit is less than that required to deform the blades of the squeezer 24, no damage will occur. In an variation of this embodiment, the pressure switch described above is adjustable for a range of pressures, allowing for the efficient squeezing of fruits of varying firmness. The operator can adjust the pressure at which the juicer will begin to retract by means of a pressure adjustment knob 45.

FIG. 4 illustrates the relative position of the upper relay switch 44, the activation switch 48, and the limit switch plate 46. Also shown are plate tabs 47 which are disposed within grooves 17 cut into the sides of housing 16. One of ordinary skill in the art will appreciate that this arrangement is necessary to insure that the plate 46 and squeezer 24 do not begin to rotate due to frictional forces in the threaded rod 22, but rather travel vertically upward and downward.

A typical construction of a piercer assembly can be seen in FIG. 5. The piercer 26 is disposed within the pivotable cup 10, and may be removed for cleaning or replacement. Depending upon consumer needs, it will be realized that alternate embodiments of a piercer or an extractor may be provided to accommodate a variety of foodstuffs, for example, piercers which are capable of extracting the juice from an entire orange can be incorporated into the apparatus of the present invention, thereby relieving the consumer of the labor required to cut the fruit to be squeezed in half. Also shown in FIG. 5 is the manner in which the cup extensions 14 reside in the pivot brackets 52 to provide mounting points for the pivotable cup 10.

Although the overall shape of pivotable cup 10 allows it to be pivoted in one direction only, the detailed illustration of the pivot bracket 52 and cup extension 14 in FIG. 6 reveals that the design of these components also regulates the pivot travel. As shown by the arrow 15 in FIG. 6, the pivotable cup 10 may only pivot in one direction and the limit of this travel is governed by the larger angled portion of the pivot bracket 52. One of ordinary skill will also appreciate that the smaller angled portion of the pivot bracket 52 will act as a clip or latch to further anchor the pivotable cup 10 in the closed position.

Figure 7:
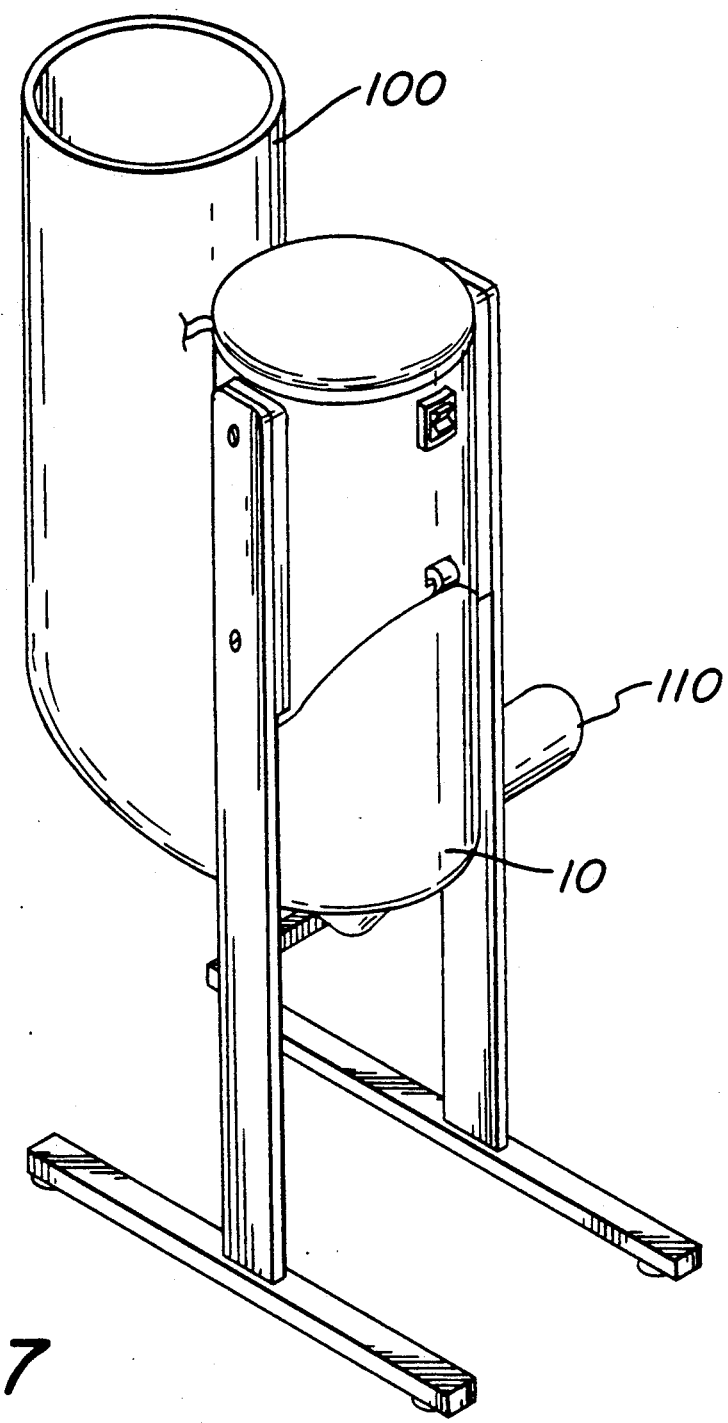
FIG. 7 illustrates the juice extractor of FIG. 1 having an automatic feed tube attached thereto.

As illustrated by FIG. 7, the present invention also encompasses embodiments wherein the fruit to be squeezed is fed into the apparatus automatically. Automatic feeding may be typically accomplished using a feeder tube or the like 100 attached to apparatus for squeezing juice, such as that illustrated by FIG. 1. In a preferred embodiment, several pieces of fruit or vegetable may be placed in the feeder tube 100 and individually fed into the apparatus for squeezing juice, the juice extracted, and the remaining pulp ejected, thereby clearing the cup for the next piece. In certain embodiments, it may be preferred that the automatic ejection be accomplished by means of a separate actuator mechanism 110, which will open and close the pivotable cup 10.

The interface between the pivotable cup 10 and the housing 16 illustrated in FIG. 7 differs from that described since it must allow the pivotable cup 10 to pivot in two directions. Other embodiments which utilize different feeding mechanisms will require the pivotable cup to be shaped otherwise. However, in any embodiment, the cup 10 must be able to provide entry access to a fresh piece of fruit from a feeder mechanism and provide exit access after the extraction cycle has been completed.

Those of ordinary skill in the art will appreciate that the location and orientation of the feeder tube 100 need not be as illustrated in FIG. 7. Those of ordinary skill will further understand that any of a number of mechanisms comprised of levers, springs, rack and pinion gear trains, magnetic latches and other devices can be combined to cause the cup 10 to automatically open and close and to act in coordination with the feeder tube to provide automatic operation. These devices may operate using the movement of the extraction mechanism or may be provided with separate actuators.

Although certain embodiments of the features of the present invention have been set forth with particularity, other embodiments are possible utilizing the spirit of the invention disclosed herein.

I claim:

1. Apparatus for extracting juice by compressing an object and collecting the juice extracted therefrom comprised of:
   (a) a housing comprised of: (i) a latch opening means for receiving a latch comprising an opening in said housing; and (ii) at least one substantially axially oriented groove disposed within an inner portion of the housing;
   (b) a substantially cylindrical pivotable cup means for retaining the object to be compressed, said cup means having a longitudinal center line and being attached to said housing at a pivot point so as to pivot about an axis between a position of alignment with the housing and a position permitting an object to be placed in the cup, the axis of said pivot point being substantially perpendicular to the longitudinal centerline of said cylindrical cup, the cup further comprised of latch means for retaining the cup in said position of alignment with the housing by extending into said latch opening in the housing;
   (c) a motor means for producing rotational motion in a forward and a reverse direction, the motor residing within the housing and connected to a source of motive power;
   (d) on/off switch means for activating the motor when the latch means and the latch opening are engaged;
   (e) safety switch means for connecting and disconnecting the source of motive power from the motor, the safety switch means disposed to be operated by the latch means and connecting the source of motive power to the motor when the latch means is engaged in said latch opening in the housing and disconnecting the source of motive power from the motor when the latch means is disengaged;
   (f) upper and lower limit switch means for controlling the rotation of the motor;
   (g) squeezing means for exerting a compressive force upon an object disposed within the pivotable cup comprising: (i) means for actuating said upper and lower limit switches; and means for cooperating with said at least one groove in the housing to prevent relative movement between the squeezing means and the housing except in the direction of said grooves; and (iii) a squeezing portion for urging against the object to be squeezed; and
   (h) power screw means for converting the rotational motion of the motor to linear motion, comprising a threaded member having two ends, a first end attached to the motor and a second end attached to the squeezing means
   whereby, when the latch means and the latch opening are engaged and the source of motive power is connected to the motor and upon actuation by the on/off switch, the motor rotates the power screw means in the forward direction, urging the squeezing means into the cup until one of said limit switches is actuated, causing the rotation of the motor to stop.

2. The apparatus of claim 1, further comprising means for automatically retracting the squeezing means from within the cup, whereby, upon actuation of the motor means to rotate in the forward direction the squeezing means travels to a lower limit position and operates said lower limit switch to thereby cause the motor means to rotate in the reverse direction and automatically retract the squeezing means from within the cup.

3. The apparatus of claim 11, further comprising means for measuring a compressive force disposed between the squeezing means and the housing, whereby upon rotation of the power screw means in the forward direction, when the compressive force measured exceeds a predetermined value, the motor means retracts the squeezing means to a position outside the cup.

4. The apparatus of claim 1, further comprising feeder means for retaining a plurality of objects to be squeezed attached to the housing adjacent to and communicating with the cup; means for automatically feeding an object into the cup; and means for ejecting the object after it has been squeezed.

5. The apparatus of claim 4, further comprising an actuator mechanism for opening the cup after the object has been squeezed and closing the cup after the object has been ejected, said actuator mechanism being attached to the housing and cooperating with the cup.

* * * * *